(12) United States Patent
Choi et al.

(10) Patent No.: US 11,508,959 B2
(45) Date of Patent: Nov. 22, 2022

(54) BATTERY ELECTRODE COMPRISING LITHIUM-COATED METALLIC MATERIAL, AND METHOD FOR MANUFACTURING SAME

(71) Applicant: AGENCY FOR DEFENSE DEVELOPMENT, Daejeon (KR)

(72) Inventors: Yu Song Choi, Daejeon (KR); Tae Young Ahn, Daejeon (KR); Hye Ryeon Yu, Daejeon (KR); Jang Hyeon Cho, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/636,360

(22) PCT Filed: May 21, 2020

(86) PCT No.: PCT/KR2020/006662
§ 371 (c)(1),
(2) Date: Feb. 18, 2022

(87) PCT Pub. No.: WO2021/071048
PCT Pub. Date: Apr. 15, 2021

(65) Prior Publication Data
US 2022/0293916 A1  Sep. 15, 2022

(30) Foreign Application Priority Data

Oct. 10, 2019  (KR) .......... 10-2019-0125695
Dec. 30, 2019  (KR) .......... 10-2019-0178521

(51) Int. Cl.
*H01M 4/36* (2006.01)
*H01M 4/66* (2006.01)
(Continued)

(52) U.S. Cl.
CPC ......... *H01M 4/366* (2013.01); *H01M 4/0404* (2013.01); *H01M 4/0471* (2013.01); *H01M 4/1395* (2013.01); *H01M 4/382* (2013.01); *H01M 4/661* (2013.01); *H01M 4/808* (2013.01); *H01M 10/052* (2013.01)

(58) Field of Classification Search
None
See application file for complete search history.

(56) References Cited

U.S. PATENT DOCUMENTS

2017/0133662 A1   5/2017   Cui et al.

FOREIGN PATENT DOCUMENTS

| KR | 10-2008-0092715 | 10/2008 |
|---|---|---|
| KR | 10-2008-0095475 | 10/2008 |

(Continued)

OTHER PUBLICATIONS

International Search Report for PCT/KR2020/006662 dated Sep. 4, 2020 (now published as WO 2021/071048) with English translation provided by WIPO.

(Continued)

*Primary Examiner* — Tracy M Dove
(74) *Attorney, Agent, or Firm* — Ladas & Parry, LLP

(57) ABSTRACT

A lithium coating method includes: coating an oxide layer having lithiophilic properties on a metal material by heating the metal material at a certain temperature; and coating a lithium layer on the oxide layer by bringing the metal material coated with the oxide layer into contact with molten lithium.

15 Claims, 14 Drawing Sheets

(51) Int. Cl.
*H01M 4/80* (2006.01)
*H01M 4/38* (2006.01)
*H01M 10/052* (2010.01)
*H01M 4/04* (2006.01)
*H01M 4/1395* (2010.01)

(56) References Cited

FOREIGN PATENT DOCUMENTS

| KR | 10-2010-0037919 | 4/2010 |
| KR | 10-1449597 | 10/2014 |
| KR | 10-2018-0004407 | 1/2018 |

OTHER PUBLICATIONS

Written Opinion of the International Searching Authority for PCT/KR2020/006662 dated Sep. 4, 2020 (now published as WO 2021/071048) with English translation provided by Google Translate.
Jin, Chengbin et al. 3D lithium metal embedded within lithiophilic porous matrix for stable lithium metal batteries. Nano Energy. May 11, 2017 (Online publication date), vol. 37, pp. 177-186.
Notification of Reason for Refusal in Korean Application No. 10-2019-0178521, dated Sep. 27, 2021.
Notice of Allowance for Korean Patent Application No. 10-2019-0178521, dated Mar. 31, 2022.

(a)           (b)           (c)

BATTERY ELECTRODE COMPRISING LITHIUM-COATED METALLIC MATERIAL, AND METHOD FOR MANUFACTURING SAME

CROSS-REFERENCE TO RELATED APPLICATIONS

This patent application is the national stage of International Patent Application No. PCT/KR2020/006662 filed on May 21, 2020, which claims priority in accordance with Article 119(a) of the U.S. Patent Law (35 USC § 119(a)) for Patent Application No. 10-2019-0125695 filed in Korea on Oct. 10, 2019, and Patent Application No. 10-2019-0178521 filed in Korea on Dec. 30, 2019, which all contents are incorporated into this patent application by reference. In addition, if this patent application claims priority for countries other than the United States for the same reason as above, all the contents are incorporated into this patent application as references.

TECHNICAL FIELD

The disclosure relates to an electrode for a battery including a lithium-coated metal material, and a method of manufacturing the same, and more particularly, to an electrode for a battery including a metal material exhibiting lithiophilic properties, and a method of manufacturing the same.

BACKGROUND ART

Lithium (Li) metal has high utility as a next-generation battery electrode due to its high capacity, low electrochemical potential, and lightweight characteristics. However, lithium has lithiophobic properties of not being easily coated on general metal, and thus, it is difficult to manufacture battery electrodes using lithium. Accordingly, there is active research on reducing lithiophobic properties of lithium and improving lithiophilic properties.

In order to reduce the discharge of carbon dioxide caused by the increase in fossil fuel consumption, the supply of electric vehicles and hybrid vehicles is expanding. Currently, it is difficult for electric vehicles to run long distances due to the limitations of the battery capacity of lithium-ion batteries. For long-distance driving, a large-capacity battery must be installed in a vehicle, however, since the vehicle sales price rises, a secondary battery with an energy density six to seven times greater than that of the existing secondary batteries is required to supply electric vehicles. Accordingly, lithium-air batteries with higher energy density than lithium-ion batteries are attracting attention.

For the purpose of commercialization of such lithium-air batteries, research is being conducted to improve battery efficiency, improve charge/discharge characteristics, and prevent contamination by moisture in the air and carbon dioxide and the like and secure safety.

Although research on the development of an electrode and an electrolyte material or the development of a catalyst is being actively conducted to achieve the above-described purpose, due to the characteristics of lithium-air batteries, a positive electrode needs to be smoothly supplied with air, and simultaneously battery constituent elements such as a negative electrode and an electrolyte need to be shielded from air. Accordingly, it is difficult to simplify and lighten the structure of a battery, and thus, the shape of a battery is very limited.

Most lithium-air batteries are formed in a pouch form, a coin form, and the like, which are similar in shape to conventional metal-air batteries, and are restricted to forms in which only a positive electrode part has a hole through which air can pass.

In this configuration, there is a difficulty in reducing the weight of the battery and simplifying the process because a process of forming a hole in the surface of a positive electrode during battery manufacturing and a sealing process of shielding other components from external air are additionally required.

Furthermore, in the case of a positive electrode, even when a positive electrode active material having a high porosity is used, there is a problem in that it is impossible to utilize the performance of the positive electrode active material to the maximum because a part exposed to the air is very limited by the battery structure.

DESCRIPTION OF EMBODIMENTS

Solution to Problem

According to an embodiment, provided is a lithium coating method including coating an oxide layer having lithiophilic properties on a metal material by heating the metal material at a certain temperature, and coating a lithium layer on the oxide layer by bringing the metal material coated with the oxide layer into contact with molten lithium.

According to another embodiment, provided is an electrode for a battery including a metal material, an oxide layer having lithiophilic properties, the oxide layer being coated on the metal material by heating the metal material at a certain temperature, and a lithium layer coated on the oxide layer by bringing the metal material coated with the oxide layer into contact with molten lithium.

According to another embodiment, provided is a battery including a negative electrode, which includes a metal material, an oxide layer having lithiophilic properties coated on the metal material by heating the metal material at a certain temperature, and a lithium layer coated on the oxide layer by bringing the metal material coated with the oxide layer into contact with molten lithium, a positive electrode, and an electrolyte arranged between the negative electrode and the positive electrode.

Advantageous Effects of Disclosure

According to the disclosure, as the lithiophilic properties of a metal foam are improved, lithium can be easily impregnated into pores of the metal foam, thereby providing a lithium-coated metal foam and an electrode for a battery including the same.

BEST MODE

Figure 1:
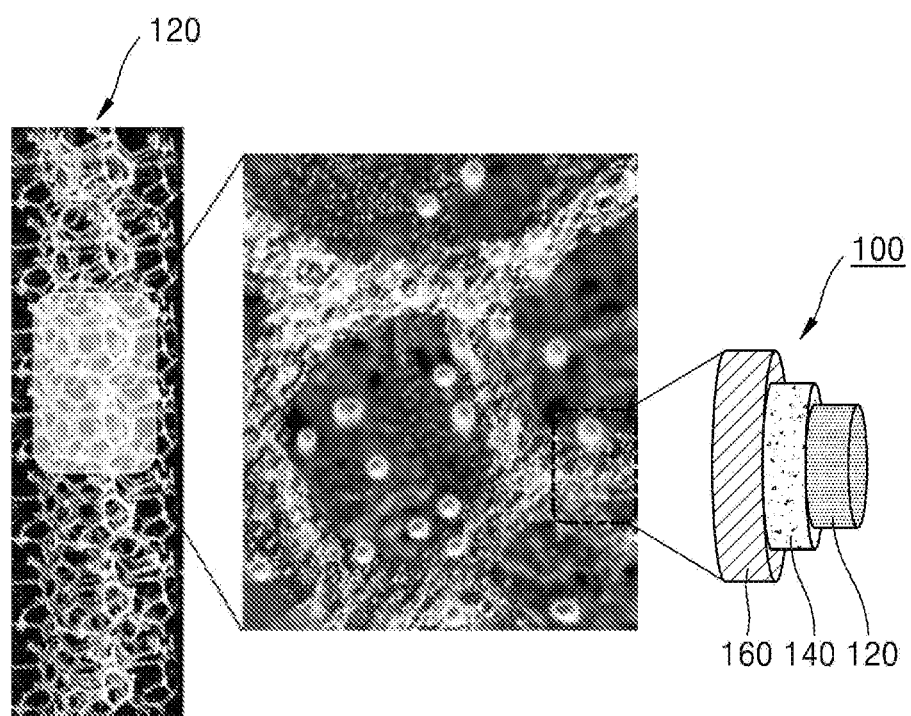
FIG. 1 is a view of an electrode for a battery including a lithium-coated metal foam, according to embodiments.

According to an embodiment, a lithium coating method includes coating an oxide layer having lithiophilic properties on a metal material by heating the metal material at a certain temperature, and coating a lithium layer on the oxide layer by bringing the metal material coated with the oxide layer into contact with molten lithium.

Furthermore, in the coating of the oxide layer on the metal material, the metal material may be heated in an air atmosphere, in a temperature range of 500 to 950° C., in a time range of one minute to one hour.

Furthermore, in the coating of the lithium layer on the oxide layer, the molten lithium may be 350 to 450° C.

Furthermore, the metal material may be a porous metal foam, and in the coating of the lithium layer, the molten lithium may be impregnated into air gaps of the metal foam.

Furthermore, the metal material may include at least one of nickel, iron, chromium, or aluminum.

According to another embodiment, an electrode for a battery includes a metal material, an oxide layer having lithiophilic properties, the oxide layer being coated on the metal material by heating the metal material at a certain temperature, and a lithium layer coated on the oxide layer by bringing the metal material coated with the oxide layer into contact with molten lithium.

Furthermore, the metal material may be a porous metal foam, and the molten lithium is impregnated into air gaps of the metal foam.

Furthermore, the metal material may include at least one of nickel, iron, chromium, or aluminum.

Furthermore, the oxide layer may include a first oxide layer formed on the metal material and a second oxide layer formed on the first oxide layer, and a composition ratio of the first oxide layer and a composition ratio of the second oxide layer are different from each other.

Furthermore, a chromium (Cr) content of the second oxide layer may be greater than an iron content of the first oxide layer.

Furthermore, an aluminum (Al) content of the first oxide layer may be greater than an aluminum content of the second oxide layer.

Furthermore, the oxide layer may be generated by heating the metal material in an air atmosphere, at a temperature range of 500 to 950° C., and in a time range of one minute to one hour.

Furthermore, the lithium layer may be coated in an area that is 50 to 98% of a total surface area of the metal foam.

Furthermore, a ratio of a thickness of the oxide layer to a ratio of a thickness of a ligament forming the metal foam may be 0.002 to 0.005.

Furthermore, a porosity of the metal foam may be 60% to 99% of a volume of the metal foam.

According to another embodiment, a battery includes a negative electrode including a metal material, an oxide layer having lithiophilic properties coated on the metal material by heating the metal material at a certain temperature, and a lithium layer coated on the oxide layer by bringing the metal material coated with the oxide layer into contact with molten lithium, a positive electrode, and an electrolyte arranged between the negative electrode and the positive electrode.

MODE OF DISCLOSURE

Detailed embodiments of the disclosure are described in detail with reference to the drawings. However, the spirit of the present invention is not limited to the presented embodiment, and a person skilled in the art who understands the spirit of the present invention may easily propose other degenerative inventions or another embodiment included within the scope of the present invention through addition, change, deletion, and the like of other constituent elements within the scope of the same concept, but this will also be included within the scope of the present invention.

Furthermore, constituent elements having the same functions within the scope of the same concept appearing in the drawings of each embodiment are described using the same reference numerals.

The terms used in the embodiments have been selected from currently widely used general terms in consideration of the functions in the disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the disclosure are defined based on their meanings in relation to the contents discussed throughout the specification, not by their simple meanings.

Throughout the specification, when a part may "include" a certain constituent element, unless specified otherwise, it may not be construed to exclude another constituent element but may be construed to further include other constituent elements. Furthermore, terms such as " . . . portion," " . . . module," and the like stated in the specification may signify a unit to process at least one function or operation and the unit may be embodied by hardware, software, or a combination of hardware and software.

In the below, with reference to the accompanying drawings, the embodiment of the present invention will be described in detail so that a person skill in the art to which the present invention pertains can easily implement the invention. However, the embodiments may be implemented in various forms and are not limited to the examples described below.

Hereinafter, the embodiments of the present invention will be described in detail with reference to the accompanying drawings.

FIG. 1 is a view of an electrode 100 for a battery including a lithium-coated metal foam, according to embodiments. Referring to FIG. 1, the electrode 100 for a battery may include a porous metal foam 120, an oxide layer 140 coated on the metal foam 120 and having lithiophilic properties, and a lithium layer 160 coated on the oxide layer 140.

The metal foam 120 is a three-dimensional porous structure having very good electrical conductivity.

The metal foam 120 may be used as a support of a battery and also a negative electrode current collector.

Lithium, as a negative electrode active material of a battery, exhibits the highest high theoretical capacity.

A material that is relatively stable to lithium that is an example of the negative electrode active material may be used for the metal foam 120.

The metal foam 120 may include a conductive metal material. For example, the metal foam 120 is manufactured using any one or more materials among nickel, iron, nickel, aluminum, chromium, silicon, molybdenum, and a stainless alloy.

The material of the metal foam 120 has the lithiophobic properties of resisting costing of bare Li, and thus it is very difficult to coat bare Li on the surface of the metal foam 120. Accordingly, according to a method of manufacturing the electrode 100 for a battery, by heating the metal foam 120 at a certain temperature, the oxide layer 140 having lithiophilic properties may be coated on the metal foam 120. Then, by bringing the metal foam 120 coated with the oxide layer 140 into contact with molten lithium, the lithium layer 160 may be coated on the oxide layer 140. Accordingly, bare Li is regularly coated on the metal foam 120, and thus, lithium is easily impregnated into the air gaps of the metal foam 120.

According to an embodiment, a ratio of the thickness of the oxide layer 140 to the thickness of a ligament constituting the metal foam 120 may be 0.002 to 0.005. The thickness ratio is an optimal thickness at which, while the oxide layer 140 changes the surface of the metal foam 120 from being lithiophobic to being lithiophilic, an oxide does not form $Li_2O$ through a rapid heating reaction with molten lithium in a lithium coating process. When the thickness of the oxide layer 140 increases out of the above range and the oxide is present on the surface of the metal foam 120 more than the above range, rapid flame occurs and oxygen of the oxide reacts with the molten lithium to produce $Li_2O$.

According to an embodiment, before the heating process, the thickness of the ligament of the metal foam 120 is about 50 to 100 μm, and the thickness of the oxide layer 140 that is generated is about 100 to 500 nm.

According to an embodiment, a certain porosity of the metal foam 120 may be 60% to 99% of the volume of the metal foam 120. When the porosity of the metal foam 120 is less than 60% of the total volume, the amount of the coated active material decreases so that the electrochemical properties may be reduced. When the porosity of the metal foam 120 exceeds 99%, the coating process may not properly performed.

According to an embodiment, the lithium layer 160 may be coated in an area that is 50 to 98% of the entire surface area of the metal foam 120. In the process of coating a negative electrode active material on the metal foam 120, as the metal foam 120 serves as a current collector of a negative electrode, the negative electrode active material is coated in an area that is 50% to 98% of the area of the metal foam 120.

When the negative electrode active material is coated in an area that is less than 50% of the area of the metal foam 120, the amount of the coated negative electrode active material is small, and thus, a high performance battery may not be formed. When the negative electrode active material is coated in an area that exceeds 98% of the area of the metal foam 120, the metal foam 120 that is a negative electrode current collector is not exposed to the outside, and thus a battery may not be formed.

Figure 2:
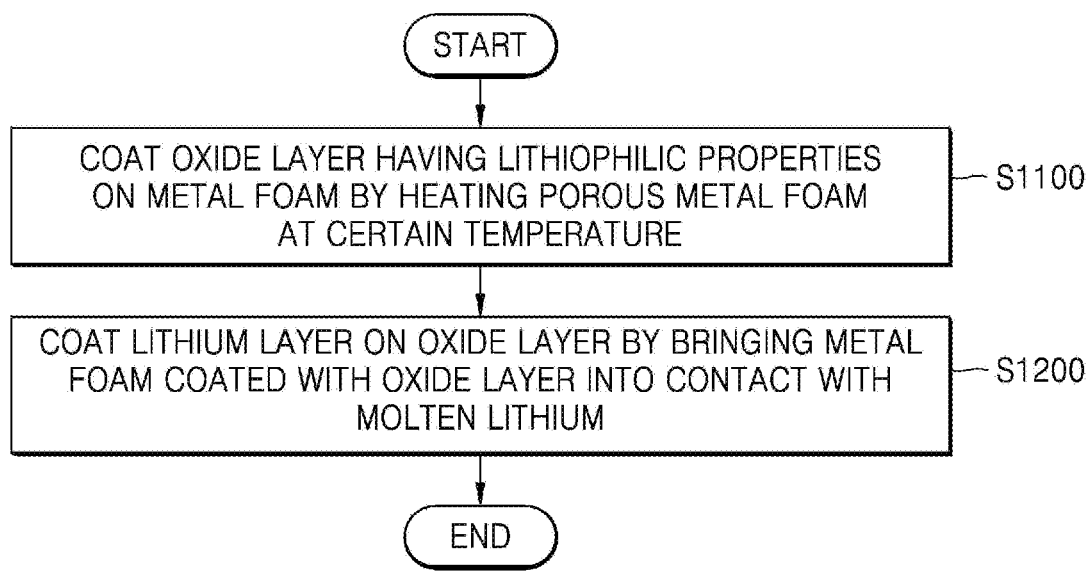
FIG. 2 is a flowchart of a method of manufacturing an electrode for a battery by coating a metal foam with lithium, according to embodiments.
Figure 3:
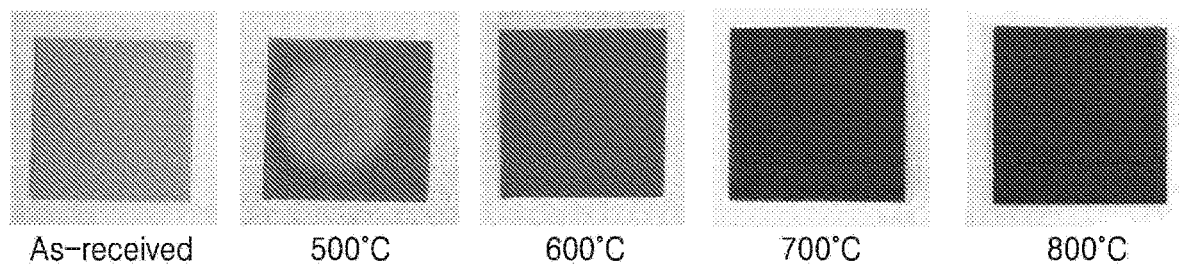
FIG. 3 is an image showing that an oxide layer is formed by heating the metal foam, according to embodiments.
Figure 4:
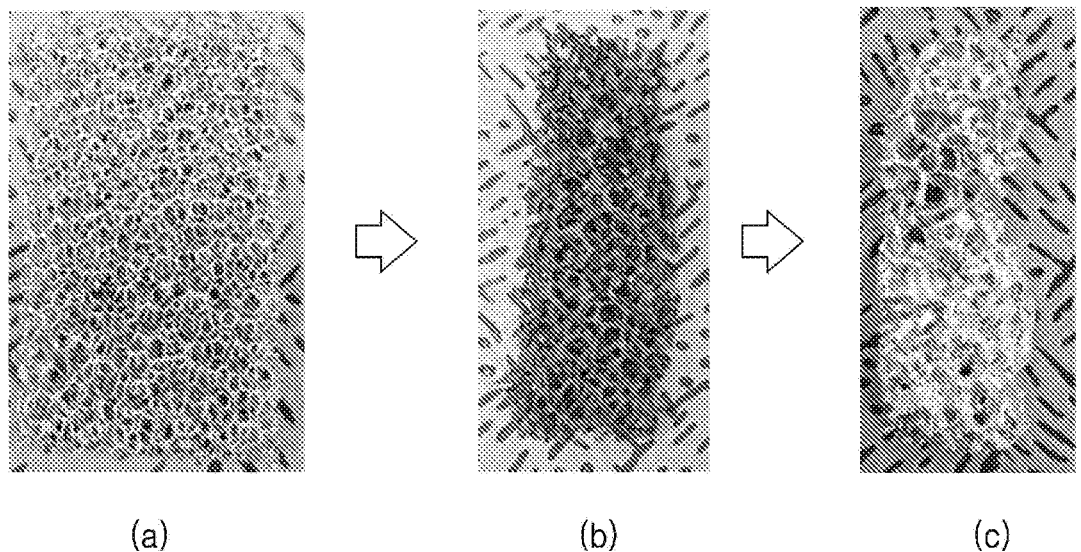
FIG. 4 shows images showing lithium coated on a metal foam, according to embodiments.

FIG. 2 is a flowchart of a method of manufacturing an electrode for a battery by coating a metal foam with lithium, according to embodiments. FIG. 3 is an image showing that the oxide layer 140 is formed by heating the metal foam, according to embodiments. FIG. 4 shows images showing lithium coated on a metal foam, according to embodiments.

Referring to FIG. 2, first, the oxide layer 140 having lithiophilic properties is coated on the metal foam 120 by heating the porous metal foam 120 at a certain temperature (S1100).

Referring to FIG. 3, the metal foam 120 is heated in an air atmosphere. The metal foam 120 may be heated in a temperature range of 500 to 950° C. Furthermore, the metal foam 120 is heated for about one minute to one hour. When the temperature is 950° C., the oxide layer 140 may be formed to a thickness of 100 to 500 nm within about one minute. In contrast, when the temperature is 500° C., the heating time may be increased up to about one hour so that an oxide layer exhibiting the lithiophilic properties may be formed.

In this state, the heating process is an isothermal heat treatment process and is regardless of an elevating temperature speed of a furnace.

By passing through a process of lithiophilically processing the surface of the metal foam 120, lithium may be regularly coated on the metal foam 120 in the subsequent process. When the oxidation process is not performed, due to high surface tension of lithium, the surface of the metal foam 120 is not soaked at all with lithium so as not to be coated.

The oxide layer 140 may include a plurality of oxide layers 140 having different compositions depending on the radial direction of the ligament of the metal foam 120, which are described below in detailed with reference to FIGS. 7 and 8.

Thereafter, the lithium layer 160 is coated on the oxide layer 140 by bringing the metal foam 120 coated with the oxide layer 140 into contact with molten lithium (S1200).

In this state, the metal foam 120 coated with the oxide layer 140 may be input to a container containing molten lithium of 350 to 450° C. The metal foam 120 on which the oxide layer 140 having lithiophilic properties is formed is soaked into bare Li melted to 350 to 450° C. to coat the surface thereof, and thus, an active material film formed of bare Li is coated on the surface of the metal foam 120.

Referring to FIG. 4, the metal foam 120 in (a) of FIG. 4 may be changed to the form of the metal foam 120 in which the oxide layer 140 is formed on a surface thereof, as shown in (b) of FIG. 4. Thereafter, the metal foam 120 having the oxide layer 140 formed thereon in (b) of FIG. 4 may be coated with lithium on the surface thereof and impregnated with lithium, as shown in (c) of FIG. 4.

In this state, in a process of melting bare Li, as the molten lithium exhibits very high reactivity with moisture, oxygen, carbon dioxide, and nitrogen in the air, the process needs to be performed in a high purity (99.999% or more) argon atmosphere.

In particular, as high temperature molten lithium reacts with even a very small amount of nitrogen to produce a black lithium nitride ($Li_3N$) compound, more preferably, molten lithium is coated by purging with high purity argon for one liter per minute or more during the molten lithium coating process.

Figure 5:
FIG. 5 is a view showing that a metal foam having an oxide layer formed thereon is impregnated with lithium.

FIG. 5 is a view showing that a metal foam having an oxide layer formed thereon is impregnated with lithium.

Referring to FIG. 5, when a metal foam 120-1 on which the oxide layer 140 that is lithiophilic is formed is impregnated into molten lithium, lithium is coated on the surface of the oxide layer 140 of the metal foam 120-1, and lithium may be easily impregnated into the air gaps of the metal foam 120-1.

In contrast, lithium is not impregnated into a metal foam 120-2 having a surface on which the oxide layer 140 is not formed.

Figure 6:
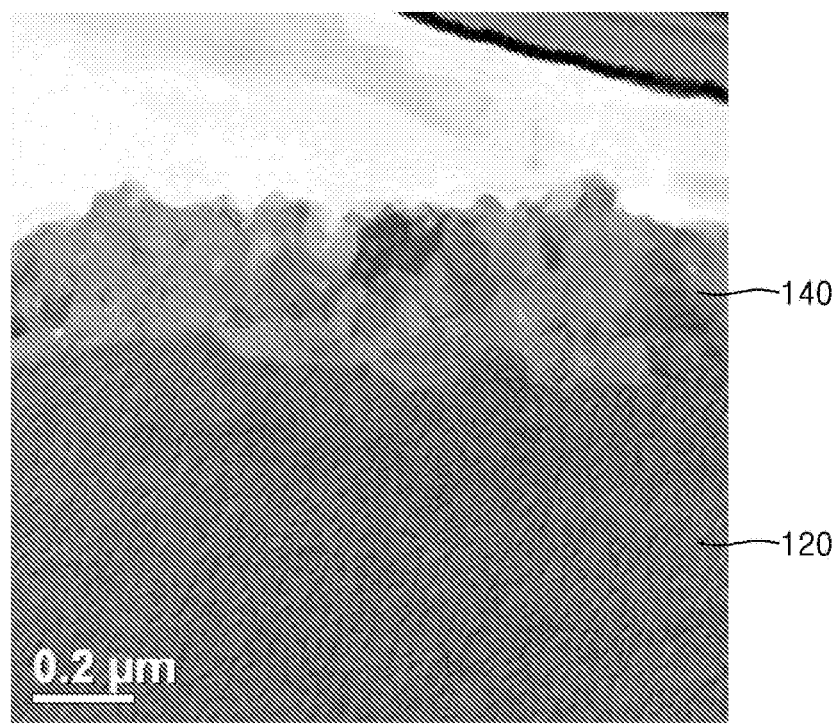
FIG. 6 is a microscope image of a metal foam coated with an oxide layer.

FIG. 6 is a microscope image of a metal foam coated with an oxide layer.

It may be seen that, after a process of heating the metal foam 120 at a temperature of 800° C. for five minutes, the oxide layer 140 having lithiophilic properties is coated on the metal foam 120.

According to an embodiment, the metal foam 120 may be formed of bare nickel, and in this case, the oxide layer 140 may include a nickel oxide ($NiO$, $Ni_2O_3$, or $NiO_2$).

FIG. 7 is microscope image of an oxide layer formed on a metal foam and a graph related to the constituent elements of the oxide layer when the metal foam is an alloy including nickel, chromium, and aluminum, according to an embodiment.

Figure 7A:
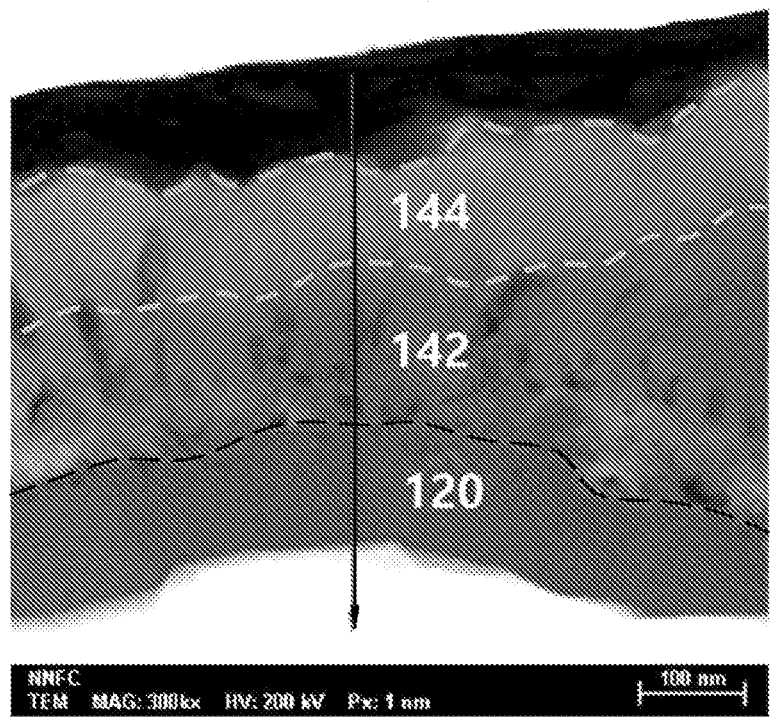
FIGS. 7A and 7B are microscope images of an oxide layer formed on a metal foam and a graph relating to the constituent elements of the oxide layer when the metal foam is an alloy including nickel, chromium, and aluminum, according to an embodiment.

Referring to FIG. 7A, it may be seen that the oxide layer 140 is formed on the metal foam 120. In this state, the oxide layer 140 may include a plurality of oxide layers formed in a radial direction of the ligament of the metal foam 120.

The plurality of oxides may be distinguished through a crystalline difference with the naked eye. For example, the oxide layer 140 may include a first oxide layer 142 formed on the surface of the metal foam 120 and a second oxide layer 144 formed on the first oxide layer 142.

Figure 7B:
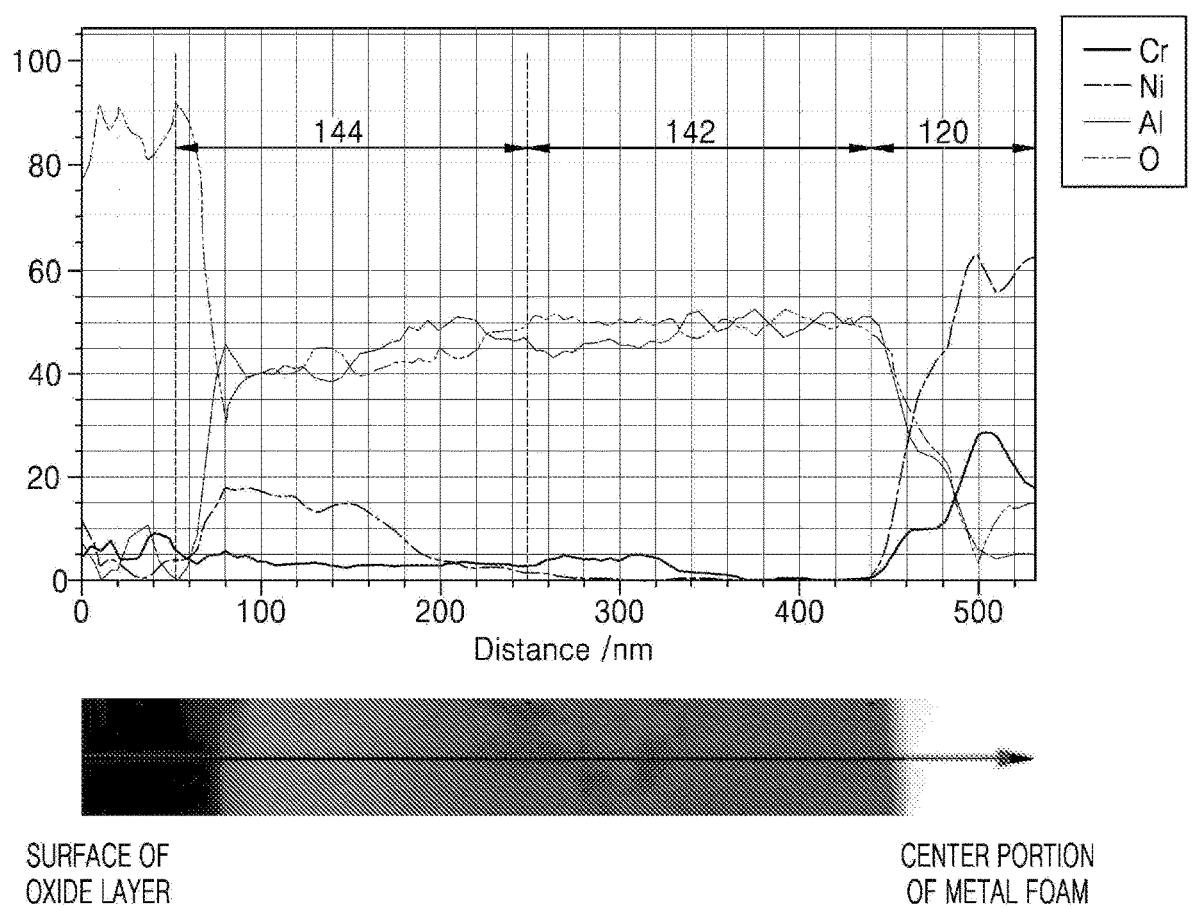

Referring to FIG. 7B, a plurality of oxides may have different compositions depending on the radial direction of the ligament of the metal foam 120. The content of nickel tends to increase as it is farther from the center portion of the metal foam 120. The content of chromium tends to increase as it is farther from the center portion of the metal foam 120. The content of aluminum tends to decrease as it is farther from the center portion of the metal foam 120.

In other words, the content of nickel in the second oxide layer 144 is greater than the content of nickel of the first oxide layer 142. The content of chromium in the second oxide layer 144 is greater than the content of chromium of the first oxide layer 142. Furthermore, the content of aluminum in the second oxide layer 144 is less than the content of aluminum of the first oxide layer 142.

FIG. 8 is microscope image of an oxide layer formed on the metal foam 120 and a graph about the constituent elements of the oxide layer when the metal foam 120 is an alloy including iron, chromium, and aluminum, according to another embodiment.

Figure 8A:
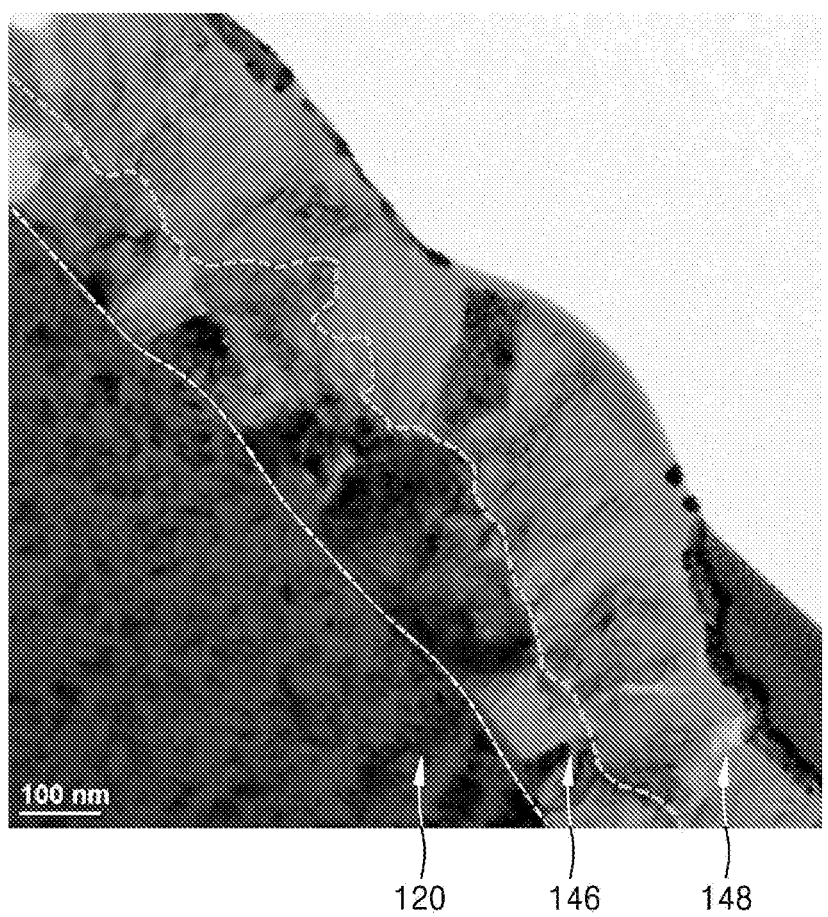
FIGS. 8A and 8B are microscope images of an oxide layer formed on a metal foam and a graph about the constituent elements of the oxide layer when the metal foam is an alloy including iron, chromium, and aluminum, according to another embodiment.

Referring to FIG. 8A, it may be seen that the oxide layer 140 is formed on the metal foam 120. In this state, the oxide layer 140 may include a plurality of oxide layers formed in the radial direction of the ligament of the metal foam 120.

The plurality of oxides may be distinguished through a crystalline difference with the naked eye. For example, the oxide layer 140 may include a third oxide layer 146 formed on the surface of the metal foam 120 and a fourth oxide layer 148 formed on the first oxide layer 142.

Figure 8B:
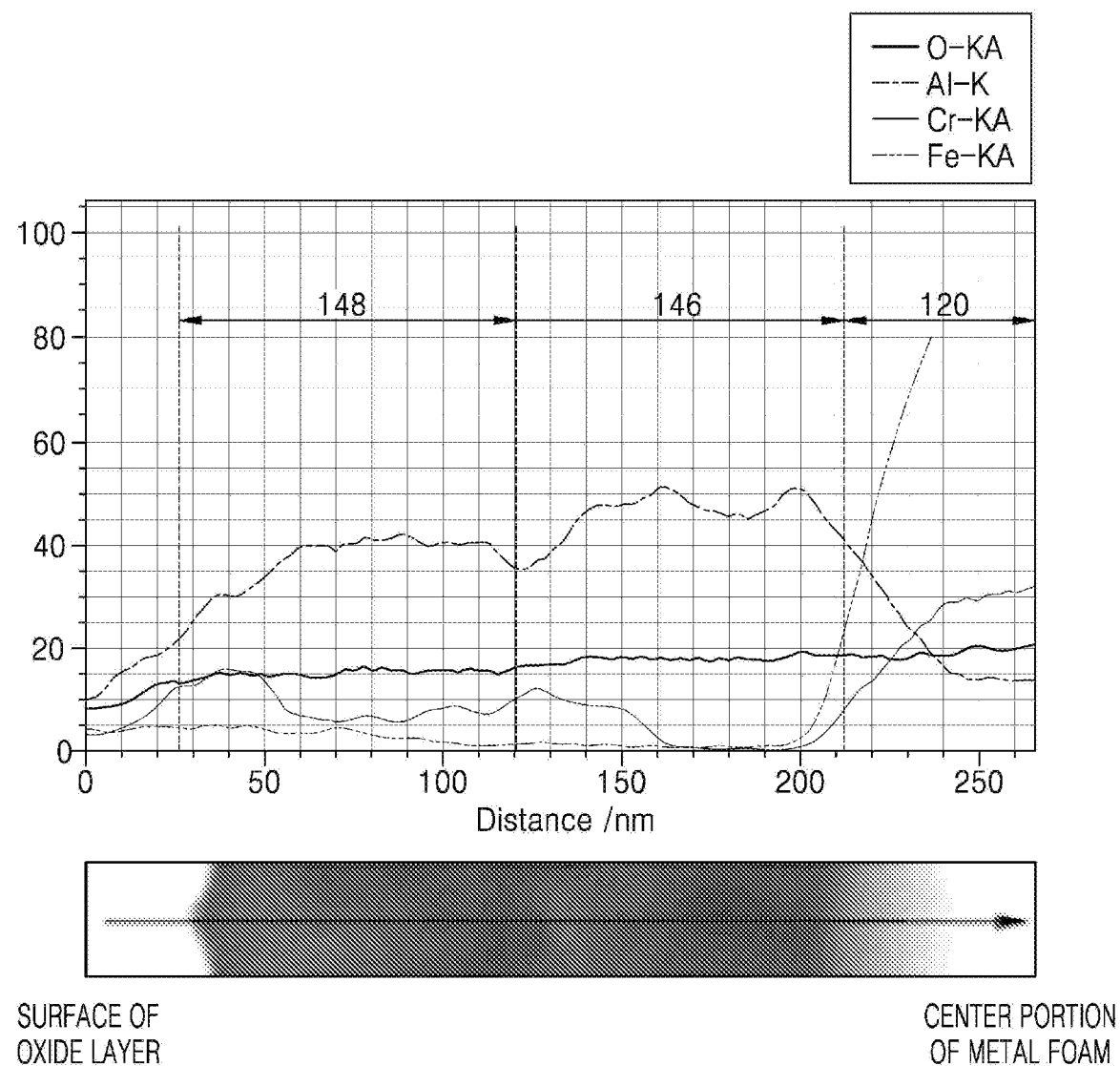

Referring to FIG. 8B, a plurality of oxides may have different compositions depending on the radial direction of the ligament of the metal foam 120. The content of chromium tends to increase as it is farther from the center portion of the metal foam 120. The content of aluminum tends to decrease as it is farther from the center portion of the metal foam 120.

In other words, the content of chromium in the fourth oxide layer 148 is greater than the content of chromium of the third oxide layer 146. Furthermore, the content of aluminum in the fourth oxide layer 148 is less than the content of aluminum of the third oxide layer 146.

In detail, it may be seen that, while a relatively large amount of a chromium oxide ($Cr_2O_3$) having lithiophilic properties is present in the fourth oxide layer 148, the amount of an aluminum oxide ($Al_2O_3$) that rather reduces soaking with lithium in the third oxide layer 146 is relatively larger than that in the fourth oxide layer 148.

As described above with reference to FIGS. 6 to 8, when an oxide layer is formed through a heat treatment process on the metal foam 120 that is formed of anyone or more materials of nickel, iron, chromium, aluminum, silicon, molybdenum, and a stainless alloy, it is important to optimize the temperature and time such that lithiophilic materials increase and lithiophobic materials decrease as it is closer to a surface far from the center portion of the metal foam 120.

For example, iron, chromium, and nickel oxides have lithiophilic properties, and aluminum has rather lithiophobic properties.

When it is out of the optimal temperature and time range, a lithiophobic aluminum oxide may be present in the surface of the metal foam 120 on which the oxide layer is formed, so that soaking with lithium may be reduced. When the time exceeds one hour, the concentration of a lithiophilic oxide may be reduced on the surface of the metal foam 120 on which the oxide layer is formed.

Figure 9:
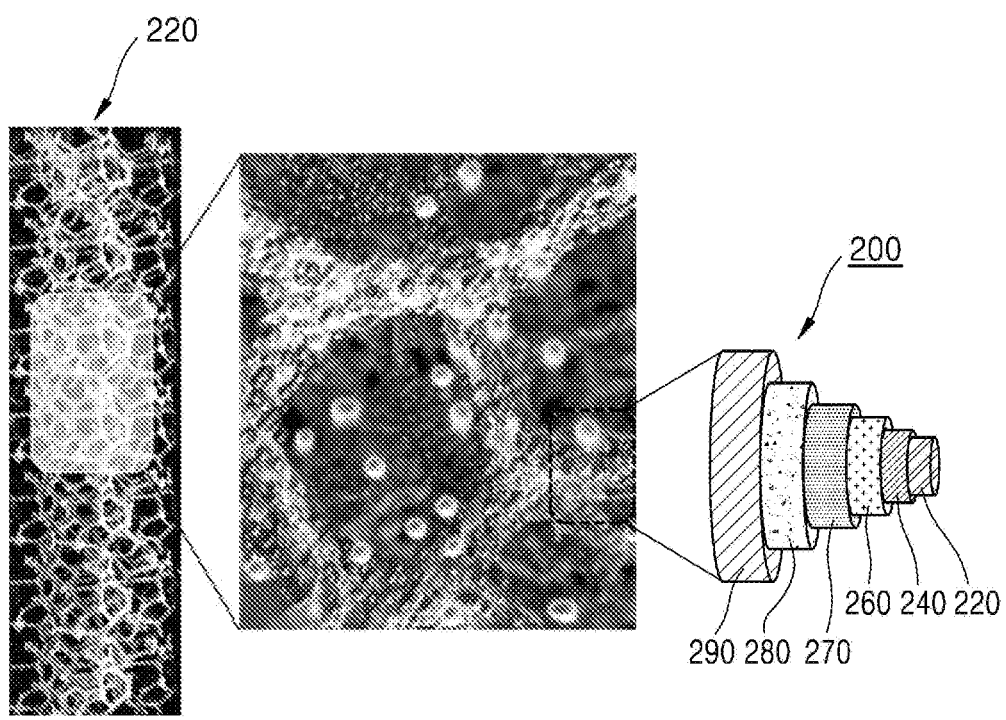
FIG. 9 is a view of a lithium-air battery using a lithium-coated metal foam, according to embodiments.

FIG. 9 is a view of a lithium-air battery 200 using a lithium-coated metal foam 220, according to embodiments. The present invention relates to the lithium-air battery 200 and a method of manufacturing the same, in which an oxide layer 240 that is lithiophilic, a negative electrode active material 260, an electrolyte layer 270, a positive electrode active material layer 280, and an air diffusion layer 290 are sequentially multi-coated on a metal foam 220 that is porous and serves as a support of the lithium-air battery 200 and as a negative electrode current collector.

Figure 10:
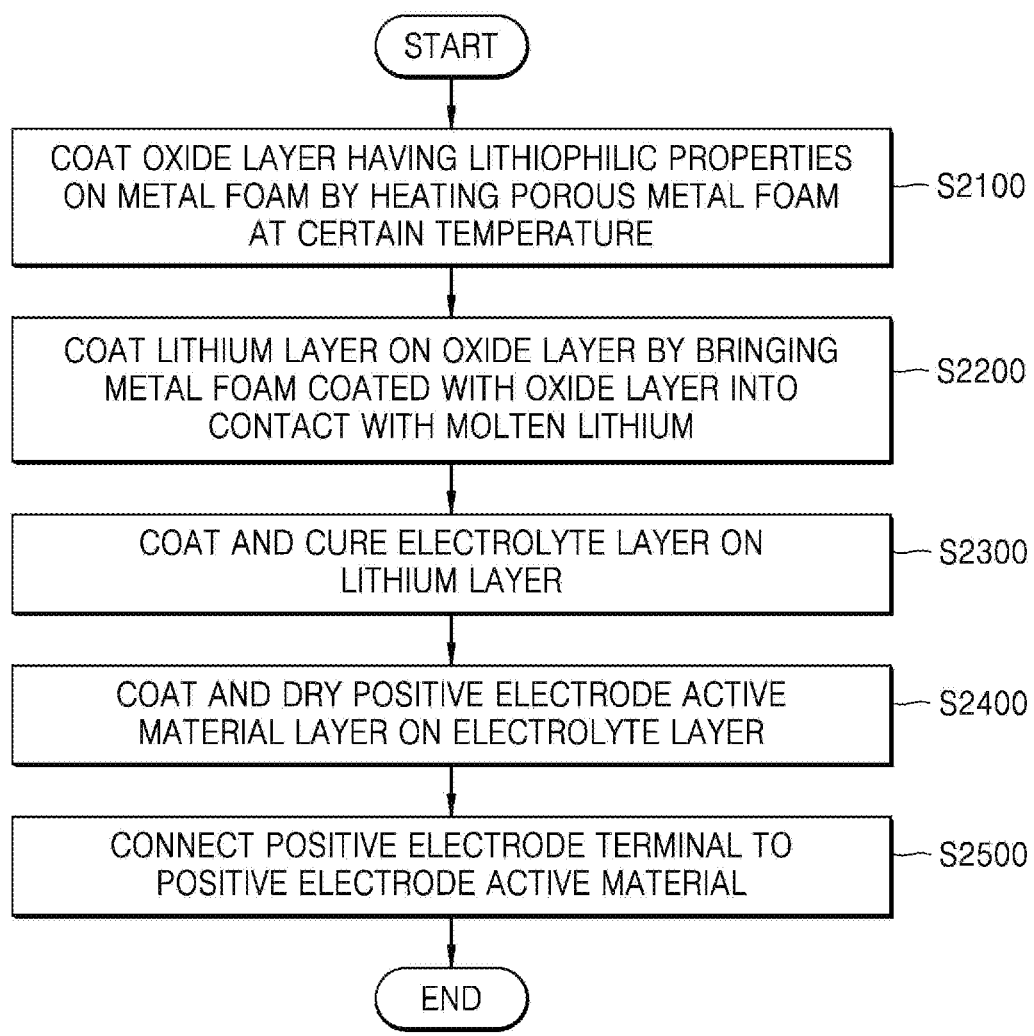
FIG. 10 is a flowchart of a method of manufacturing a lithium-air battery, according to embodiments.
Figure 11:
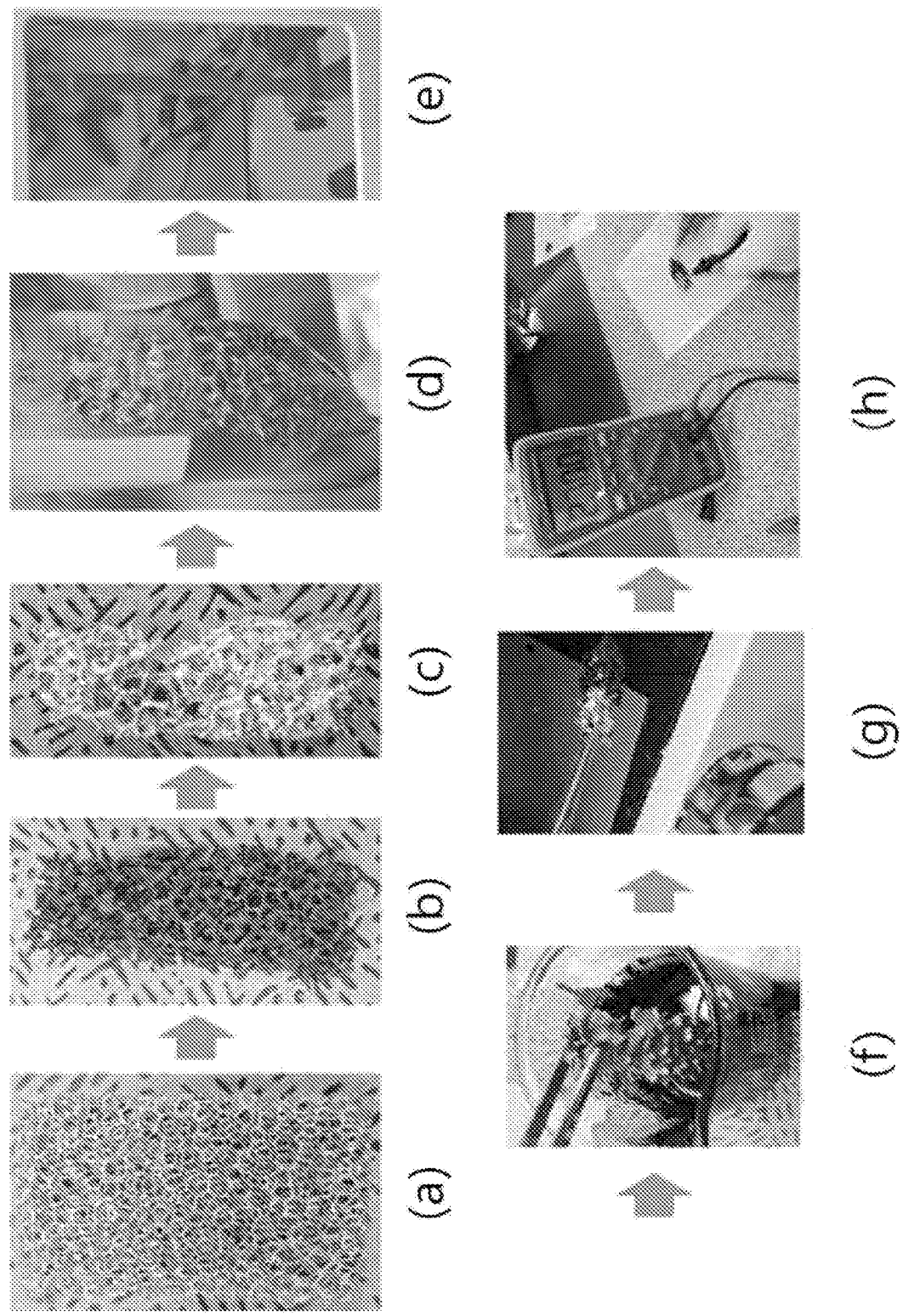
FIG. 11 shows images of manufacturing a lithium-air battery, according to embodiments.

FIG. 10 is a flowchart of a method of manufacturing the lithium-air battery 200, according to embodiments. FIG. 11 shows images of manufacturing the lithium-air battery 200, according to embodiments.

The method of manufacturing the lithium-air battery 200 may include coating the oxide layer 240 having lithiophilic properties on the metal foam 220 by heating the porous metal foam 220 at a certain temperature (S2100). Referring to (b) of FIG. 11, the surface of the metal foam 220 is oxidized in atmospheric condition at a temperature of 500 to 950° C. for one hour or less. According to an embodiment, the surface of the metal foam 220 is oxidized in atmospheric condition at a temperature of 500 to 900° C. for one minute to one hour. The contents described above in operation S1100 may be applied to S2100.

Thereafter, coating a negative electrode active material on the metal foam 220 is performed (S2200). Referring to (c) of FIG. 11, as an example of the negative electrode active material, lithium is impregnated into air gaps of the metal foam 220 so as to coat the metal foam 220. The contents described above in operation S1200 may be applied to S2200.

According to an embodiment, before coating an electrolyte layer on the lithium layer 260, a process of thinly coating on negative electrode active material with an alloy of copper and nickel to protect the negative electrode from moisture, carbon dioxide, and the like in the air may be added.

Thereafter, coating an electrolyte on the metal foam 220 coated with the negative electrode active material may be performed (S2300). Referring to (d) of FIG. 11, to prevent the negative electrode active material coated on the metal foam 220 from being exposed to the air, the surface of the negative electrode active material is completely blocked from the outside during the coating of electrolyte.

In this state, a material having excellent ion conductivity may be used as the electrolyte, specifically an electrolyte having ion conductivity of $10^{-3}$ to $10^{-4}$ S/cm or more.

According to an embodiment, an electrolyte polymer material may include ETPTA (trimethyloppropane ethoxylate triacrylate) and PVDF-HFP (poly(vinylidene fluoride-hexafluoropropylene)) alone or in combination. For example, the electrolyte polymer material may include ETPTA of 50 weight % and PVDF-HFP of 50 weight %.

Referring to (e) of FIG. 11, the coated electrolyte may be cured through ultraviolet (UV) light. According to an embodiment, HMPP (2-Hydroxy-2methylpropiophenone) may be used as a UV curing initiator. For example, a weight of HMPP used may be 0.1% of the weight of ETPTA.

According to an embodiment, as a solid electrolyte, PVDF-HFP is heated in NMP (N-methyl-2-pyrrolidone) or DMF (dimethylformamide) to 60° C. to 90° C., and is homogenized through agitation in a heater state for about five hours.

In this state, a carbonate-based or ether-based lithium battery electrolyte such as $LiBF_4$, $LiPF_6$, EC (ethylene carbonate), DME (di-methylether), and the like may be mixed with a polymer electrolyte by 30 to 70 volume %. Thereafter, thermosetting or UV curing may be performed.

According to an embodiment, an electrolyte obtained by adding 1 M LITFSI (lithium bis(trifluoromethanesulfonyl) imide) lithium salt to TEGDME (tetraethylene glycol dimethyl ether) may be used as a solid electrolyte. In this state, a solid electrolyte polymer solution (ETPTA and PVDF-HFP) and a liquid electrolyte of 1M LITFSI+TEGDME may be mixed at a volume ratio of 6:4.

Thereafter, coating a positive electrode active material on the metal foam 220 coated with the solid electrolyte is performed (S2400). Referring to (f) of FIG. 11, the positive electrode active material is manufactured using a porous carbon material or a carbon material complex using the same, to maximize a reaction area with air.

The porous carbon material that is a positive electrode active material may include a material formed of carbon such as active carbon, graphene, carbon nanofiber, carbon black, reduced graphene oxide, and the like, and any one of complexes manufactured using the same. Thereafter, drying the coated positive electrode active material is performed.

Thereafter, referring to (g) of FIG. 11, connecting a positive electrode terminal to the metal foam 220 coated with the positive electrode active material is performed (S2500). An air diffusion layer (ADL) may be stacked after the positive electrode active material is coated. In the connecting of the positive electrode terminal to the metal foam 220 coated with the positive electrode active material layer 280, the positive electrode terminal is connected to a portion where the air diffusion layer 290 is coated.

In other words, the lithium-air battery 200 manufactured by the method of manufacturing the lithium-air battery 200 may maintain the three-dimensional shape of the porous metal foam 220, without change, such that a metal surface forming the metal foam 220 is simply coated with electrode active materials and an electrolyte.

Accordingly, when viewed from a cross-section of the electrode surface, the metal foam 220 that is a support of a battery and also a negative electrode current collector is provided at the center, and then the lithium layer 260 that is a negative electrode active material, the electrolyte layer 270, and the positive electrode active material layer 280 are sequentially multi-stacked and coated on the surface of the metal foam 220.

The lithium-air battery 200 manufactured by the above manufacturing method has the effects of lightening a battery and simplifying battery manufacturing process and structure. Furthermore, as the positive electrode using a porous carbon material is coated on the surface of the metal foam 220, which is porous, the exposure of the positive electrode to the air is maximized, thereby securing double the effect of porosity.

Figure 12:
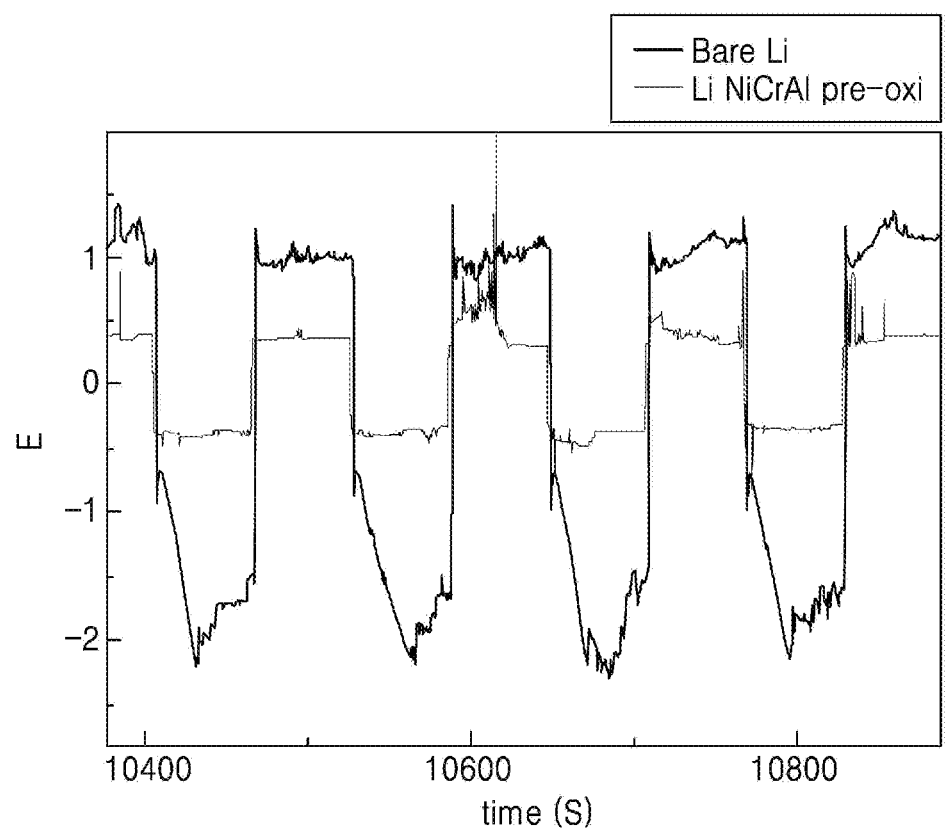
FIG. 12 shows a cycle discharge test result of a lithium coin cell using a metal foam coated with a lithium layer, according to embodiments.

FIG. 12 shows a cycle discharge test result of a lithium coin cell using a metal foam coated with a lithium layer, according to embodiments.

Referring to FIG. 12, a lithium metal electrode is manufactured by coating lithium on a nickel-chromium-aluminum metal foam coated with an oxide layer, and is processed to be an electrode having a diameter of 12 mm, and then, a symmetric coin cell is manufactured by using 1M LiTFSI TEGDME (lithium bis(trifluoromethanesulfonyl)imide tetraethylene glycol dimethyl ether) electrolyte and charged/discharged to 0.05 $mA/cm^2$.

According to a discharge test result at 10000 seconds, it is confirmed that bare Li is greatly polarized, whereas a nickel-chromium-aluminum metal foam negative electrode coated with a lithium layer, which is coated with an oxide layer and then coated with lithium is polarized quite less compared with the bare Li and has improved hysteresis according to a discharge current.

In the electrode for a battery including a lithium-coated metal foam and a lithium battery manufactured by a manufacturing method thereof, a lithiophilic oxide layer is generated by a simple and easy method and coated with bare Li, and thus, a high capacity lithium metal electrode of a lithium battery is manufactured, thereby remarkably improving the characteristics of a battery. There are effects of stably impregnating lithium into the pores of the metal foam 220 that is porous, solving a problem due to the volume change of a lithium negative electrode occurring in a lithium plating/stripping process during the charge/discharge of a metal foam, and exhibiting excellent cycle properties.

The description of the presented embodiments is provided so that a person with ordinary skill in the technology field of the present invention may use or practice the present invention. Various modifications of these embodiments will be apparent to those of ordinary skill in the art of the present invention, and the general principles defined herein may be applied to other embodiments without departing from the scope of the present invention. Thus, the present invention is not to be limited to the embodiments presented herein, but is to be construed in the widest scope consistent with the principles and novel features presented herein.

The invention claimed is:

1. A lithium coating method comprising:
coating an oxide layer having lithiophilic properties on a metal material by heating the metal material at a certain temperature; and
coating a lithium layer on the oxide layer by bringing the metal material coated with the oxide layer into contact with molten lithium,
wherein:
the oxide layer comprises: a first oxide layer formed on the metal material; and a second oxide layer formed on the first oxide layer, and
a composition ratio of the first oxide layer and a composition ratio of the second oxide layer are different from each other.

2. The lithium coating method of claim 1, wherein, in the coating of the oxide layer on the metal material, the metal material is heated in an air atmosphere, in a temperature range of 500 to 950° C., in a time range of one minute to one hour.

3. The lithium coating method of claim 1, wherein, in the coating of the lithium layer on the oxide layer, the molten lithium is 350 to 450° C.

4. The lithium coating method of claim 1, wherein
the metal material is a porous metal foam, and
in the coating of the lithium layer, the molten lithium is impregnated into air gaps of the metal foam.

5. The lithium coating method of claim 1, wherein the metal material comprises at least one of nickel, iron, chromium, or aluminum.

6. An electrode for a battery, comprising:
a metal material;
an oxide layer having lithiophilic properties, the oxide layer being coated on the metal material by heating the metal material at a certain temperature; and
a lithium layer coated on the oxide layer by bringing the metal material coated with the oxide layer into contact with molten lithium,
wherein:
the oxide layer comprises: a first oxide layer formed on the metal material; and a second oxide layer formed on the first oxide layer, and
a composition ratio of the first oxide layer and a composition ratio of the second oxide layer are different from each other.

7. The electrode for a battery of claim 6, wherein
the metal material is a porous metal foam, and
the molten lithium is impregnated into air gaps of the metal foam.

8. The electrode for a battery of claim 6, wherein the metal material comprises at least one of nickel, iron, chromium, or aluminum.

9. The electrode for a battery of claim 6, wherein a chromium (Cr) content of the second oxide layer is greater than an iron content of the first oxide layer.

10. The electrode for a battery of claim 6, wherein an aluminum (Al) content of the first oxide layer is greater than an aluminum content of the second oxide layer.

11. The electrode for a battery of claim 6, wherein the oxide layer is generated by heating the metal material in an air atmosphere, at a temperature range of 500 to 950° C., and in a time range of one minute to one hour.

12. The electrode for a battery of claim 7, wherein the lithium layer is coated in an area that is 50 to 98% of a total surface area of the metal foam.

13. The electrode for a battery of claim 7, wherein a ratio of a thickness of the oxide layer to a ratio of a thickness of a ligament forming the metal foam is 0.002 to 0.005.

14. The electrode for a battery of claim 7, wherein a porosity of the metal foam is 60% to 99% of a volume of the metal foam.

15. A battery comprising:
a negative electrode comprising a metal material, an oxide layer having lithiophilic properties coated on the metal material by heating the metal material at a certain temperature, and a lithium layer coated on the oxide layer by bringing the metal material coated with the oxide layer into contact with molten lithium;
a positive electrode; and
an electrolyte arranged between the negative electrode and the positive electrode, wherein:
the oxide layer comprises: a first oxide layer formed on the metal material; and a second oxide layer formed on the first oxide layer, and
a composition ratio of the first oxide layer and a composition ratio of the second oxide layer are different from each other.

* * * * *